United States Patent [19]

Holtje

[11] 4,125,766
[45] Nov. 14, 1978

[54] AUTOMATIC ELECTRONIC FLASH DEVICE

[75] Inventor: Wilfried Höltje, Braunschweig, Fed. Rep. of Germany

[73] Assignee: Rollei Werke Franke & Heidecke, Braunschweig, Fed. Rep. of Germany

[21] Appl. No.: 741,250

[22] Filed: Nov. 12, 1976

[30] Foreign Application Priority Data

Nov. 26, 1975 [DE] Fed. Rep. of Germany ... 7537557[U]

[51] Int. Cl.² .................................. H01J 39/12
[52] U.S. Cl. ....................... 250/214 SF; 354/128
[58] Field of Search ............. 250/214 P, 214 SF, 239; 354/33, 34, 35, 27, 127, 128, 140, 145; 315/156, 134, 135, 241 P, 241 S

[56] References Cited

U.S. PATENT DOCUMENTS

| | | | |
|---|---|---|---|
| 3,601,022 | 8/1971 | Langnau | 354/34 |
| 3,614,918 | 10/1971 | Hennig et al. | 354/33 X |
| 3,631,779 | 1/1972 | Hori et al. | 354/128 |
| 3,635,136 | 1/1972 | Hori et al. | 354/128 |
| 3,636,843 | 1/1972 | Hori et al. | 354/128 |
| 3,733,986 | 5/1973 | Hayashi et al. | 354/128 X |
| 3,869,604 | 3/1975 | Prochnow | 354/127 X |
| 3,917,944 | 11/1975 | Eisenberger et al. | 250/239 |

*Primary Examiner*—David C. Nelms
*Attorney, Agent, or Firm*—Smyth, Pavitt, Siegemund, Jones & Martella

[57] ABSTRACT

An automatic electronic flash device or computer flash device for cameras. The device includes besides an electronic flash lamp a capacitor capable of being discharged through the flash lamp. Also there is a light sensitive sensor and a device for extinguishing the flash lamp in response to the light falling upon the sensor. There are also provided two signal lamps, one for indicating whether the capacitor is charged, and the other one for indicating that the flash lamp has been discharged. A housing which can be separated from the flash device contains the sensor. The housing is capable of being secured to a camera and both signal lamps are visibly arranged at the rear surface of the sensor housing.

3 Claims, 3 Drawing Figures

AUTOMATIC ELECTRONIC FLASH DEVICE

BACKGROUND OF THE INVENTION

This invention relates to an automatic electronic flash device sometimes called a computer flash device and particularly relates to a flash device to improve visibility of the signal lamps conventionally associated with the device.

Known flash devices of this type are provided with two signal lamps at the rear of the flash device. On the other hand, the housing containing the light sensitive sensor sometimes called the external sensor, is attached to the view finder connector shoe of the camera in such a manner that the sensor is directed in the direction of the object to be photographed.

One of the signal lamps is connected to the flash capacitor to indicate to the photographer whether or not the flash capacitor has been charged to a sufficiently high voltage so that a flash exposure is possible. As is well known, the external sensor disposed at the camera receives the flash light reflected from the object and compares the measured light intensity with a value corresponding to the optimum illumination. When this value has been reached, the automatic arrangement of the flash device interrupts the discharge of the flash lamp to be extinguished. This enables the photographer to determine whether the automatic arrangement is active or whether the distance to the object to be photographed is too large and therefore a sufficiently exposed film cannot be obtained (which can generally be recognized in that the automatic circuit does not respond). The second signal lamp lights up as soon as the flash lamp has, in fact, been automatically extinguished.

In such flash devices having an external sensor it is conventional practice to connect the flash device with a camera by means of rail or it is held by hand or is disposed at some convenient place in the room. Upon arranging the two signal lamps at the rear surface of the flash device the photographer who wants to assure himself whether the flash device is ready to function or whether the flash light automatic arrangement has functioned, is forced to move his eye before and after each exposure from the viewfinder of the camera to check whether the signal lamps of the flash device are illuminated. This is not only disagreeable, but valuable opportunities for taking pictures may be missed.

In a known flash device which is connected with the photographic camera and which is only provided with a single signal lamp to indicate that the flash lamp is ready, this disadvantage is removed in the following manner. An indicator element is disposed in the optical path of the viewfinder of the camera, the indicator element being, for example, a luminescent diode or the like which can be connected to the output of a circuit, the input signal of which is derived from the feed current of the flash lamp. The photographer then recognizes when he looks through the viewfinder whether the flash device is ready to function or not.

The disadvantage of this construction is that it requires a special design of the flash device and camera. Accordingly, such flash devices and cameras cannot be utilized separately with other flash devices or cameras. Furthermore, the introduction of two signal lamps in the optical path of the viewfinder of the camera in somewhat questionable particularly if the camera is already "loaded" with sophisticated technical equipment because frequently in that case, the viewfinder is already filled with various indicator elements for time and aperture values.

SUMMARY OF THE INVENTION

It is an object of the present invention to provide a flash device of the type discussed which enables the photographer when using a photographic camera to check whether the flash device is ready to function, as well as the function of the automatic flash circuitry without the necessity to remove the eye from the camera viewfinder and to look at the reverse side of the flash device.

A further object of the present invention is to provide a flash device as previously discussed which may be utilized interchangeably with different photographic cameras.

In accordance with the present invention these objects are achieved in that both signal lamps are visibly arranged at the rear surface of the sensor housing. Because for automatic operation the sensor housing is pushed upon the connector shoe of the viewfinder of the camera, the two signal lamps are disposed immediately above the viewfinder. Therefore, the user of the camera can discern the lighting up of the signal lamps at any time without the necessity to remove his eye from the viewfinder of the camera. Because the sensor housing is provided with a connector foot of standard size, it can be fastened to all cameras. In this case, it is well known by means of the corresponding contact of the connector foot and connector shoe of the viewfinder that the synchronous excitation of the flash lamp takes place when the shutter is opened.

According to a further extension of the invention, a device is provided at the lower portion of the flash device into which the sensor housing may be introduced. When the flash device is inserted upon the connector shoe of the viewfinder of the camera the two signal lamps are again directly above the viewfinder.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENT

Figure 1:
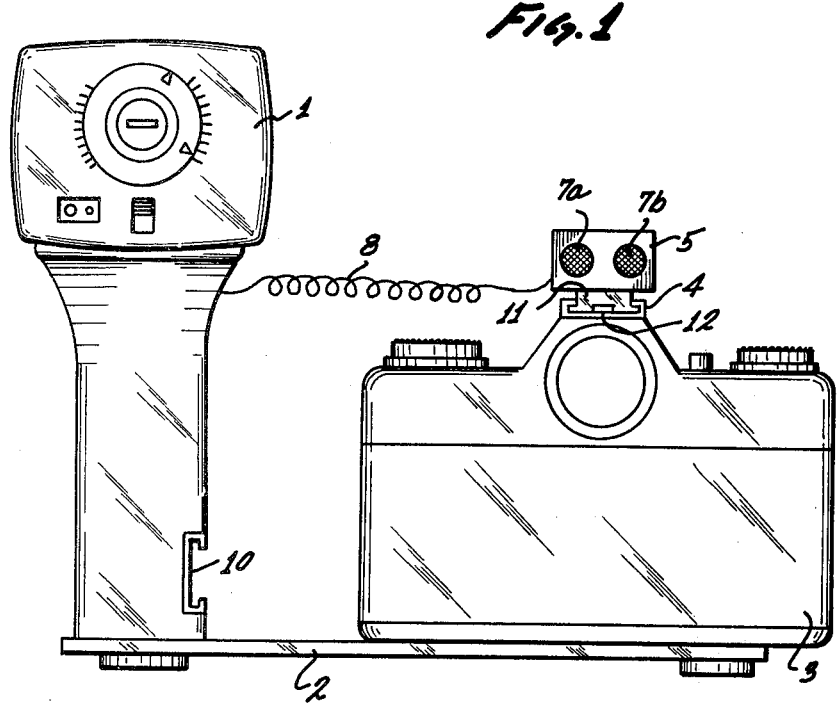
FIG. 1 is a rear elevational view of a camera and flash device.

Referring now to the drawings and particularly to FIG. 1, there is illustrated a flash device 1 connected by a flash rail 2 with a camera 3. The camera is provided with a connector shoe 4 on the viewfinder and a casing 5 having connector foot 11 is shifted into the shoe 4. The casing 5 is provided at its front surface with a light sensitive sensor 6 as shown in FIG. 3 while the rear surface is provided with two signal lamps 7a and 7b. The casing 5 is connected by a multi-lead cable 8 electrically with the flash device so that the two signal lamps 7a and 7b and the sensor 6 are part of the flash circuit. Furthermore, the connector foot 11 carries a synchronous contact 12 (see FIG. 2) which corresponds to the synchronous contact of the hot connector shoe of the camera viewfinder and which is connected by means of one of the leads of the cable with the flash device. By means of this synchronous contact, the synchronous release of the flash lamp takes place when the shutter is released.

Figure 2:
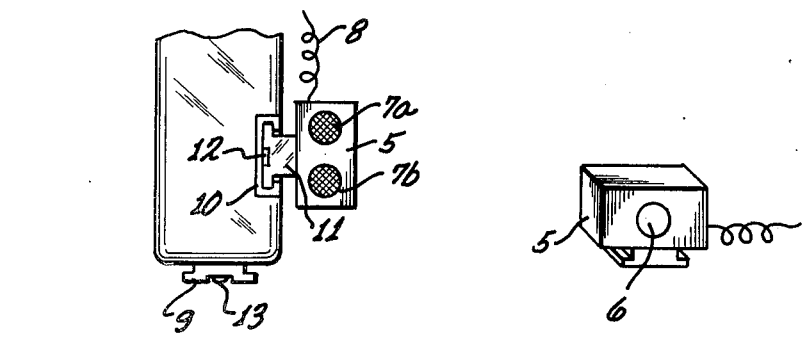
FIG. 2 is a partial rear elevation view on enlarged scale of the flash device with its means for securing the sensor housing.
Figure 3:
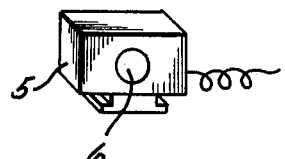
FIG. 3 is a front view in perspective of the sensor housing showing the light sensitive sensor.

In order to be able to introduce the flash device directly upon the connector shoe 4 of the viewfinder of the camera, the flash device as shown in FIG. 2 is provided in a known manner with a corresponding connector foot 9 which also has a synchronous contact 13. Furthermore, laterally and directly above the connector foot 9 there is provided a connector shoe 10 for the foot 11 of the sensor housing 5. In this manner the sensor housing may be attached to the flash device by maintaining electrical connections so that the two signal lamps 7a and 7b are again disposed directly above the viewfinder even when the flash device is attached to the camera. In this arrangement, the synchronous contact 12 in the connector foot 11 of the sensor housing 5 does not operate and the flash device is synchronously released by means of the synchronous contact 13.

The invention is not limited to the embodiments described above but all changes and modifications thereof not constituting departures from the spirit and scope of the invention are intended to be included.

I claim:

1. An automatic electronic flash device for use with a camera having a connector shoe, comprising:
    a flash attachment energized by discharge of a capacitor through a flash lamp and having a connector foot for selective insertion into the connector shoe, further having a connector shoe adjacent to the connector foot;
    a casing, including a front surface and a rear surface, and being connected to the flash attachment by an electrical cable;
    a connector foot of a standard type on said casing for fastening said casing alternatively to the camera and to the flash attachment by insertion of the foot of the casing into one of said shoes;
    a light-sensitive sensor mounted within the casing for sensing light incident on the front surface of said casing;
    a first signal lamp located on the rear surface of said casing for indicating when the capacitor is in a charged condition; and
    a second signal lamp located on the rear surface of said casing for indicating when the flash lamp has been flashed.

2. The device of claim 1, wherein said casing further comprises a synchronous contact for establishing a conductive path between the camera and the flash attachment.

3. The device of claim 2, wherein said synchronous contact is located at said connector foot.

* * * * *